United States Patent Office 3,461,721
Patented Aug. 19, 1969

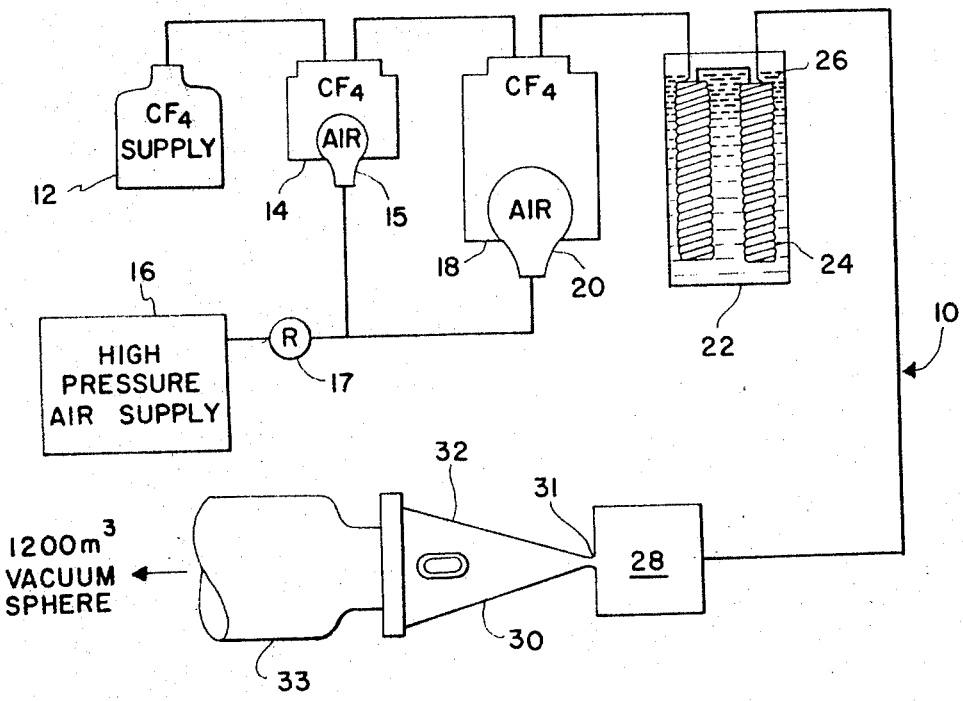
FIG. 1
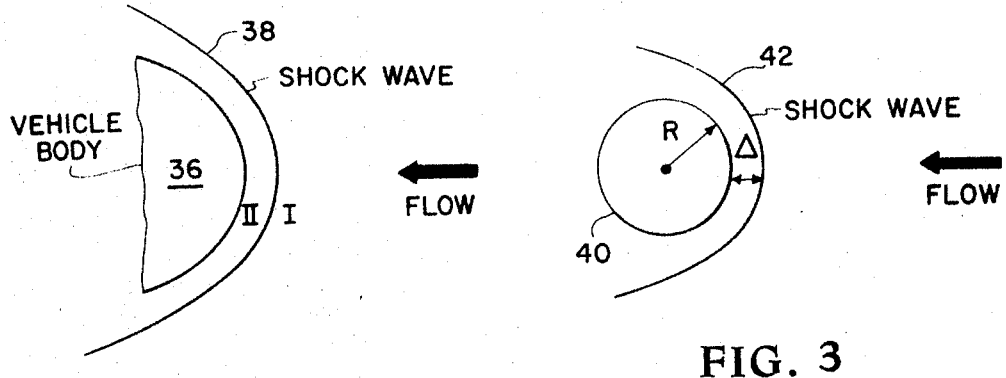
FIG. 2
FIG. 3

3,461,721
FLOW FIELD SIMULATION
Robert A. Jones, Newport News, and James L. Hunt, Hampton, Va., assignors to the United States of America as represented by the Administrator of the National Aeronautics and Space Administration
Filed Dec. 28, 1967, Ser. No. 694,317
Int. Cl. G01m 9/00
U.S. Cl. 73—147      8 Claims

ABSTRACT OF THE DISCLOSURE

The flow fields that would be encountered by a blunt vehicle upon entry into a planetary atmosphere are simulated without involving the high temperatures that would occur in actual flight. The test gas used is a heavy gas having a small specific heat ratio, such as $CF_4$.

---

This invention was made by employees of the National Aeronautics and Space Administration and may be manufactured and used by or for the Government of the United States without the payment of any royalties thereon or therefor.

This invention relates generally to flow field simulation and relates in particular to a method of simulating the flow field over the face of a blunt vehicle body in very high speed flight (10,000–50,000 ft./sec.) upon entry into a planetary atmosphere without duplicating the extremely high temperature conditions (7,000°–25,000° F.) that would be present under actual flight conditions. As used in the following description, the expression "blunt body" refers to configurations having a minimum shock wave inclination angle of 60° over its face as, for example, conical configurations having a half-angle greater than 45°.

In man's continuous exploration of space more and more attempts will be made to land manned and unmanned space vehicles on the various planets, and, in many instances to return these vehicles to earth. It has already been determined that the landing of instrument packages on Mars, for example, presents unique problems due to the thin atmosphere composed primarily of $CO_2$ gas. In order to make use of aerodynamic braking in a Mars mission a large, very blunt, high drag vehicle will be required. For such vehicles the drag as well as stability are determined by the pressures acting on the vehicle face. It is known that for such vehicles the "real gas effects" occurring in the shock layer due to the high temperature conditions will result in surface pressures different from those measured under wind tunnel conditions. These vehicles will therefore have different aerodynamic characteristics in flight and ground tests and it becomes necessary to provide a process for simulating flight flow fields in wind tunnel type facilities.

Under flight conditions the real gas effects are caused by chemical reactions occurring in the shock layer, or layer of gas between the shock wave and the vehicle body, due to the very high temperatures developed in this region. Part of the heat energy available goes to dissociate the gas in this shock layer. This is particularly true for planetary atmospheres like Mars where the atmosphere is essentially $CO_2$ which dissociates very easily, with velocities of only 10,000 ft./sec. being required for dissociation of $CO_2$. Since part of the available heat energy is expended in chemical reactions, the temperatures of the gas in the shock layer is thus lowered and the density increased considerably more than that which would occur for the same gas at lower temperatures where no chemical reactions occurred. The best measure of the extent of the "real gas effects" taking place is the ratio of the gas density in the shock layer to the gas density in the free stream. For very blunt bodies, i.e., half angles greater than 45°, the shock shape, distance between the shock wave and the vehicle body and body surface pressure distribution all become dependent upon this shock density ratio. Since all of these factors are dependent upon vehicular flow field and the entire flow field is an important factor to consider in the design of a vehicle intended for use in planetary flight, the value for this density ratio becomes important. The value of this density ratio for planetary entry conditons is known to vary to values as high as twenty. However, in prior art wind tunnel type facilities even in those of large energy content, shock density ratios of only eight have been obtainable with the small models necessary for use in these facilities. These small models, which are usually only a few inches diameter, necessarily have thin shock layers. The chemical reactions occurring within the shock layer require many collisions between molecules and atoms in order to reach an equilibrium condition. Therefore in the very thin shock layers associated with tests in high enthalpy ground facilities there is not sufficient time for these reactions to go to completion. Consequently such facilities have yet not been able to simulate the flow field for blunt vehicles which in flight may be ten or twenty feet in diameter.

Accordingly, it is an object of the present invention to provide a method of simulating flow fields for blunt vehicles in which the shock density ratios obtainable exceed those of prior art facilities.

Another object of the present invention is to provide a novel method of simulating the flow field that would be encountered by a blunt vehicle upon entry into a planetary atmosphere.

Another object of the present invention is a method of simulating the flow field of a high speed vehicle in a planetary atmosphere by utilizing a heavy non-dissociating gas as the test gas in a wind tunnel.

Another object of the present invention is a method of simulating the flow field of a high speed vehicle in a planetary atmosphere without having to duplicate the high temperatures or the chemical reactions that would normally occur in an actual flight.

According to the present invention the foregoing and other objects are attainable by employing, as the test gas in a wind tunnel facility, a low temperature-low velocity flow of a gas that has the proper value of specific heat for simulating the flow field that would be encountered by blunt vehicles upon entry into a planetary atmosphere. The expression "low temperature-low velocity flow" as used herein refers to a total temperature less than 2000° F. and flow velocity less than 5000 ft./sec.

A more complete appreciation of the invention and many of the atendant advantages thereof will be better understood as the same becomes more apparent by reference to the following detailed description when considered in connection with the accompanying drawings, wherein:

FIGURE 1 is a schematic representation of the wind tunnel utilized in the present invention;

FIGURE 2 is a schematic representation of a blunt vehicle model body as it would appear under test conditions in the test section of the wind tunnel shown in FIG. 1;

FIGURE 3 is a schematic representation of a simulated test for determining shock density ratios by measurement of shock standoff distance of a sphere.

Figure 4:
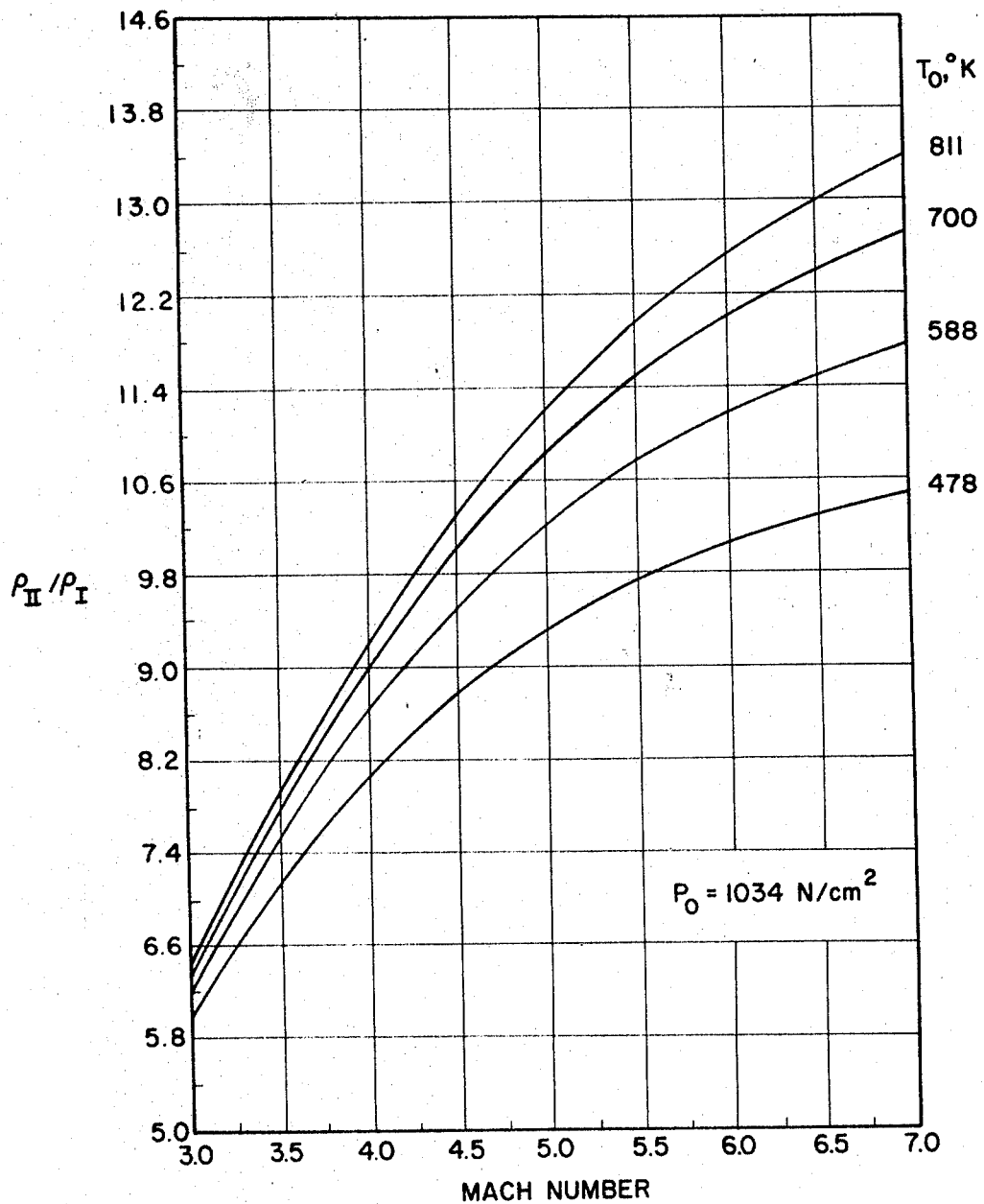
FIGURE 4 is a plot of the shock density ratio as a function of Mach number for a specific total pressure and with the total temperature obtained being indicated.

Referring now more particularly to the drawings, FIG. 1 is a schematic representation of a small pilot-model hypersonic (Mach 6) test facility, generally designated by reference numeral 10, built at NASA's Langley Research Center for use with $CF_4$ as the test gas and capable of testing models as small as one-half inch diameter. $CF_4$ was selected as the test gas because of its many favorable properties for this simulation. That is, $CF_4$ is a readily available non-toxic gas having a very low ratio of specific heat and yet requiring a relatively high temperature (in the range of 3300° R.) for dissociation. The specific heat ratio of $CF_4$ is 1.16 at room temperature compared with 1.40 for air. The $CF_4$ supply for use in facility 10 consists of several bottles, one of which is shown and designated by reference numeral 12, with each bottle 12 containing about 32 kg. of $CF_4$ at a pressure of 1440 $N/cm^2$. A small pneumatic accumulator 14, having an air bag 15, is used together with a check valve arrangement (not shown) and a high pressure air system 16 to pump the $CF_4$ into a large accumulator 18 at the pressure desired for a test. When the desired pressure is reached in large accumulator 18, high pressure air regulator 17 is set at this value and a valve (not shown) between the air bag 20 in the large accumulator and air supply 16 is opened. As $CF_4$ is used during a test the air bag 20 is inflated and thus maintains a constant tunnel stagnation pressure for times as long as three minutes. A heat exchanger 22 consists of several long coiled stainless steel tubes, schematically shown and designated by reference numeral 24, immeresd in a bath of molten lead 26 which may be maintained at any temperature between room temperature and 812° K. Electrical strip heaters (not shown) are also immersed in the lead and used to provide heat. The heat exchanger 22, the line from the heat exchanger to stagnation chamber 28 and the stagnation chamber itself are all heated electrically, as is conventional, and all are provided with suitable insulation. This conventional heating and insulation system is not shown in the interest of clarity. The nozzle 30 of tunnel 10 is conical with a 5 degree half-angle, a 1.32 mm. diameter throat 31, and a 7.6 cm. diameter test section 32. Tunnel 10 is exhausted by way of conduit 33 into a 1200 $m.^3$ vacuum sphere which may be pumped to pressures as low as 25 $N/m.^2$. Operating velocity of tunnel 10 is in the range of 3300 ft./sec. with the $CF_4$ stagnation conditions of approximately 2500 p.s.i.a. and 500–1000° F. for testing of the models. The $CF_4$ used in testing may be either thrown away or reclaimed, from the vacuum sphere. The use of various and suitable pressure gages, check, bleed, and safety valves in facility 10 are obviously necessary but have been omitted in the interest of clarity since their use and location would be readily apparent to those skilled in the art.

Referring now more particularly to FIG. 2, a blunt vehicle model body 36 is schematically shown undergoing flow field simulation test in facility 10. The shock wave generated by body 36 is designated by reference numeral 38, the free stream region by reference I and the shock layer region (that area between the shock wave 38 and body 36) by reference II. It is known that for flight conditions the real gas effects are caused by chemical reactions occurring in the shock layer (region II) due to the very high temperatures developed in this region. Part of the heat energy available goes to dissociate the gas in region II. This is particularly true for planetary atmospheres like Mars which is made up largely of $CO_2$ which dissociates very easily. Since part of the available heat energy is used up in the chemical reactions, the temperature of the gas in region II is lowered and the density is increased considerably more than that which would occur for the same gas at lower temperatures where no chemical reactions occurred. The best measure of the extent of the "real gas effects" taking place is the ratio of the gas density in the shock layer, region II, to the gas density in the free stream, region I ($\rho_{II}/\rho_I$). For very blunt bodies the shock shape, distance between the shock and the body, surface pressure distribution, in fact the entire flow field over the face, becomes dependent upon this shock density ratio ($\rho_{II}/\rho_I$). The value of this density radio for planetary entry conditions is known to vary to values as high as twenty. However, in existing wind tunnel type facilities even those of large energy content shock density ratios of only eight can be obtained with the small models necessary for use in these facilities.

All previous attempts to simulate such flow field have been methods or devices for obtaining higher temperature or higher velocity flows in test facilities in order to match flight conditions. However, the flow simulation method of the present invention makes use of another much easier way. As pointed out hereinbefore, to simulate the flow field about the body face of very blunt vehicles it is only necessary to match the shock density ratio $\rho_{II}/\rho_I$. For supersonic flow of a gas in which no chemical reactions are taking place this shock density ratio is dependent on the specific heat values of the gas rather than reactions resulting from extremely high temperatures. Therefore, large shock density ratios can, in theory, be obtained with a low velocity-low temperature flow of a gas having the proper value of specific heat. In this manner one can, in theory, obtain a simulation of the flow field over blunt shapes. In practice, this theory has been proven by the facility described hereinbefore and illustrated in FIG. 1.

Many tests and several different types of measurements have been made in this pilot facility. The primary purpose of these measurements was to demonstrate that large shock density ratios, and thus flow field stimulation for blunt bodies, could be obtained with the method of the present invention. The secondary purpose was to verify the theoretical calculations made for hypersonic flow of $CF_4$ and studying the operating characteristics of the facility so that a more nearly optimum facility could be built. The normal shock density ratios obtained were determined in several different ways. One of the ways will now be described in reference to FIG. 3. The easiest and most conclusive way of determining this shock density ratio was from measurements of the shock wave 42 standoff distance of a sphere 40 (Δ in FIG. 3). This was done by means of a conventional spark shadowgraph system, the measurements being taken from the film using a microscope for accuracy. The ratio of shock standoff distance to sphere radius Δ/R was used to determine the shock density with the following equation:

$$\rho_{II}/\rho_I = 0.76\ R/\Delta$$

This relation between shock density ratio and shock standoff distance is very well established both experimentally and theoretically in the literature. Two of the test conditions for which such measurements have been made are set forth in the table below:

| Total Temp., ° K., $T_o$ | Total pressure, $N/cm.^2$, $P_o$ | Mach No. $M_\infty$ | Density ratio $\rho_{II}/\rho_I$ |
|---|---|---|---|
| 736 | 1,650 | 6 | 12.2 |
| 431 | 1,015 | 7 | 10.0 |

These experimentally determined shock density ratios are in excellent agreement with those calculated assuming equilibrium flow of $CF_4$ through normal shock waves by using conventional calculation procedures and the known properties of the gas.

A plot of the shock density ratio as a function of Mach number and total temperature is shown in FIG. 4 for a total pressure of 1034 $N/cm.^2$. Calculations based on the performance of facility 10 show that by increasing the total temperature to only 1370° K. a shock density ratio of seventeen can be obtained. These total temperatures are considerably less than those encountered in flight. For example, a shock density ratio of thirteen, which has been obtained in this facility at a total temperature of 812° K., provides a flow field simulation for a blunt body flying in the earth's atmosphere at 200,000 ft. altitude and a velocity of 18,500 ft./sec. at a total temperature in the shock layer of 5300° K. for equilibrium conditions, as determined from previous well established tables.

In addition to using the method of the present invention in the pilot hypersonic $CF_4$ facility 10 described hereinbefore, it has also been used in a ballistic range. Ballistic ranges have the capability of obtaining large normal shock density ratios in the actual gas of a planetary atmosphere at velocities up to 20,000 ft./sec. However to do so they must operate with very high free stream pressures in order to obtain equilibrium composition of the gas in the shock layer due to the very small size of the models. This high pressure limits their ability to obtain dynamic stability data under high density ratio conditions since the model motion must go through a certain number of oscillations over the instrumented portion of the flight path. This number of oscillations is a function of the pressure in the range and, simulation of the desired flow field requires higher pressures than those at which dynamic stability data can be obtained. Dynamic stability data have been obtained for blunt configurations at shock density ratios up to seventeen for the first time by using this method in the pressurized ballistic range at the Naval Ordnance Laboratory. Launch velocities approaching but less than 5000 ft./sec. were sufficient to give the flow simulation of a blunt body in flight in the earth's atmosphere at velocities up to 50,000 ft./sec.

Obviously, with the much lower total temperatures associated with the flow simulation method of this invention than in actual flight conditions, aerodynamic heating cannot be simulated. This method does provide an adequate simulation, however, of the shock shape, shock standoff distance, flow streamlines, surface pressure distribution, and forces and moments acting on the face of blunt vehicles. Each of these simulations is important to the designer in determining the final configuration for high speed-high drag planetary entry vehicles. For example, studies of stability of blunt bodies under simulated flight conditions can be made when employing the method of the present invention. Another example would be the measurement of the shock shape for a vehicle under simulated flight conditions which is necessary in order to calculate the radiative heating that would be encountered.

Some of the obvious advantages of this flow field simulation method are (a) the flow field simulations for blunt vehicles at shock density ratios twice as high as prior art methods are attainable; (b) the required total temperatures are an order of magnitude less than known methods and this simulation is independent of model size since no chemical reactions occur; (c) the flow simulation method of the present invention is relatively inexpensive compared to known methods; (d) accurate data can be easily obtained due to the low total temperature and long test time available; and (e) the test gas used in this simulation has a high index of refraction making optical studies such as schlieren or shadowgraphs much easier.

Although the invention has been described relative to the specific advantages pointed out above, other uses and advantages will be readily apparent to those skilled in the art.

What is claimed as new and desired to be secured by Letters Patent of the United States is:

1. A method of simulating the flow field that would be expected for a blunt vehicle upon entry into a planetary atmosphere without having to simulate the extreme temperatures that would occur in actual flight, comprising the steps of:
   (a) providing a blunt entry vehicle model,
   (b) subjecting said model to a test gas flow of a velocity range not exceeding 5,000 ft./sec.,
   (c) said test gas being a heavy gas having a small specific heat ratio, and
   (d) said test gas being employed at a relatively low temperature and having the inherent chemical property characteristic of being free from dissociation and other chemical reactions during these test conditions.

2. The method of claim 1 wherein said test gas is $CF_4$.

3. The method of claim 2 wherein said $CF_4$ flow simulates the shock shape, flow streamlines and pressure surface distributions on said model that would be expected in actual flight.

4. The method of claim 1 wherein said test gas is pressurized to a stagnation pressure of approximately 2,500 p.s.i.a. and heated to a stagnation temperature in the range of 500–1,000° F. for testing of said model.

5. A method of simulating the flow field about a blunt vehicle upon entry into a planetary atmosphere at speeds where chemical reactions would take place in the gas in the vehicle shock layer without having to duplicate either the high temperature or the chemical reactions that would occur in actual flight, comprising the steps of:
   (a) providing a model of a blunt entry vehicle,
   (b) testing said model in a gas flow having a velocity approaching 5,000 ft./sec.,
   (c) said test gas being a heavy gas having a small specific heat ratio,
   (d) said test gas being at a relatively low temperature and free from any dissociation or other chemical reactions during testing.

6. The method of claim 5 wherein said test gas is $CF_4$ and the flow of said $CF_4$ about said model simulates the shock shape, shock standoff distance, flow streamlines, and surface pressure distribution on said model that would be expected in actual flight.

7. The method of claim 6 wherein said $CF_4$ is heated to a stagnation temperature in the range of 500–1000° F. and pressurized to approximately 2500 p.s.i.a. for testing of said model.

8. The method of claim 5 wherein said gas flow is in a wind tunnel and the total tunnel temperature is approximately 812° K. to thereby provide a flow field simulation for said blunt vehicle flying in the earth's atmosphere at 200,000 ft. altitude and at a velocity of 18,500 ft./sec. at a total temperature of approximately 5300° K.

References Cited

UNITED STATES PATENTS

| | | |
|---|---|---|
| 3,238,345 | 3/1966 | Clark et al. |
| 3,392,577 | 7/1968 | Barr et al. _____ 73—147 |
| 3,410,142 | 11/1968 | Daiber et al. _____ 73—147 XR |

LOUIS R. PRINCE, Primary Examiner

J. NOLTON, Assistant Examiner